US009965055B2

(12) United States Patent
Valentine et al.

(10) Patent No.: US 9,965,055 B2
(45) Date of Patent: May 8, 2018

(54) PASSIVE STYLUS WITH RFID-ENABLED SENSING

(71) Applicant: Motorola Mobility LLC, Chicago, IL (US)

(72) Inventors: Mark F Valentine, Kenosha, WI (US); Jiri Slaby, Buffalo Grove, IL (US); Hong Zhao, Naperville, IL (US)

(73) Assignee: MOTOROLA MOBILITY LLC, Chicago, IL (US)

( * ) Notice: Subject to any disclaimer, the term of this patent is extended or adjusted under 35 U.S.C. 154(b) by 302 days.

(21) Appl. No.: 14/803,736

(22) Filed: Jul. 20, 2015

(65) Prior Publication Data

US 2017/0024028 A1 Jan. 26, 2017

(51) Int. Cl.
*G06F 3/038* (2013.01)
*G06F 3/0354* (2013.01)
*G06F 3/041* (2006.01)

(52) U.S. Cl.
CPC .......... *G06F 3/03545* (2013.01); *G06F 3/038* (2013.01); *G06F 3/0416* (2013.01); *G06F 2203/04101* (2013.01)

(58) Field of Classification Search
CPC .... G06F 3/03545; G06F 3/038; G06F 3/0416; G06F 2203/04101
See application file for complete search history.

(56) References Cited

U.S. PATENT DOCUMENTS

| 5,953,001 A * | 9/1999 | Challener ........... G06F 3/03545 345/179 |
| 2007/0126716 A1* | 6/2007 | Haverly ................ G06F 3/0346 345/179 |
| 2009/0206995 A1* | 8/2009 | Forster ............... G06K 19/0726 340/10.1 |
| 2012/0331546 A1* | 12/2012 | Falkenburg ......... G06F 3/03545 726/16 |

OTHER PUBLICATIONS

William Wong, "The Year of the Digital Pen", Alt.Embedded, http://electronicdesign.com/blog/yeardigitalpen, Jul. 15, 2015, 4 pages.
Tablet PC Review, "Wacom EMR vs. N-Trig v. Wacom AES", http://forum.tabletpereview.com/threads/wacomemrvsntrigvswacomaes.65666/, Jul. 15, 2015, 9 pages.

\* cited by examiner

*Primary Examiner* — Lisa Landis

(57) ABSTRACT

In embodiments of a passive stylus with RFID-enabled sensing, a computing device includes a touchscreen that senses touch contact, and includes an RFID interrogator to interrogate passive RFID tags. The stylus includes a conductive tip designed for interaction with the touchscreen of the computing device. The stylus integrates a pressure sensor that senses pressure when the conductive tip of the stylus contacts the touchscreen. The stylus also includes at least one RFID antenna that is positioned in a body of the stylus to prevent detuning the RFID antenna when the stylus is held for use. The passive RFID tag can receive pressure sensor data from the pressure sensor in the stylus, and the (Continued)

passive RID tag can be read by the RFID interrogator to determine the pressure applied to the conductive tip of the stylus in order determine whether the stylus is contacting the touchscreen or only hovering above it.

20 Claims, 4 Drawing Sheets

PASSIVE STYLUS WITH RFID-ENABLED SENSING

BACKGROUND

Portable devices, such as mobile phones, tablet devices, digital cameras, and other types of computing and electronic devices may be designed with a touchscreen for user input with a stylus or touch contact. Typically, a user can contact the touchscreen of a device to access the functionality of the device. For example, touchscreen contact may be used to open, close, and use applications, or to modify device settings. However, the data captured by a conventional touchscreen that is used with a passive stylus generally only indicates whether the stylus is contacting the touchscreen and, if so, the x-y position of the stylus on the touchscreen. Further, most capacitive or resistive touchscreens used with a passive stylus have difficulty determining whether the stylus is actually touching the touchscreen, or merely hovering close to it. This can limit the functionality of the touchscreen and/or cause the touchscreen to misinterpret user input.

In contrast, an active stylus is a powered input device that can measure contact pressure between the stylus and the touchscreen, and provide that information to the device to help distinguish between contact and hovering. However, to measure and transmit this data, an active stylus requires a battery or other power source inside the stylus. Further, the device receiving and processing the input information from an active stylus also uses additional device power.

BRIEF DESCRIPTION OF THE DRAWINGS

Embodiments of a passive stylus with RFID-enabled sensing are described with reference to the following Figures. The same numbers may be used throughout to reference like features and components that are shown in the Figures.

DETAILED DESCRIPTION

Figure 1:
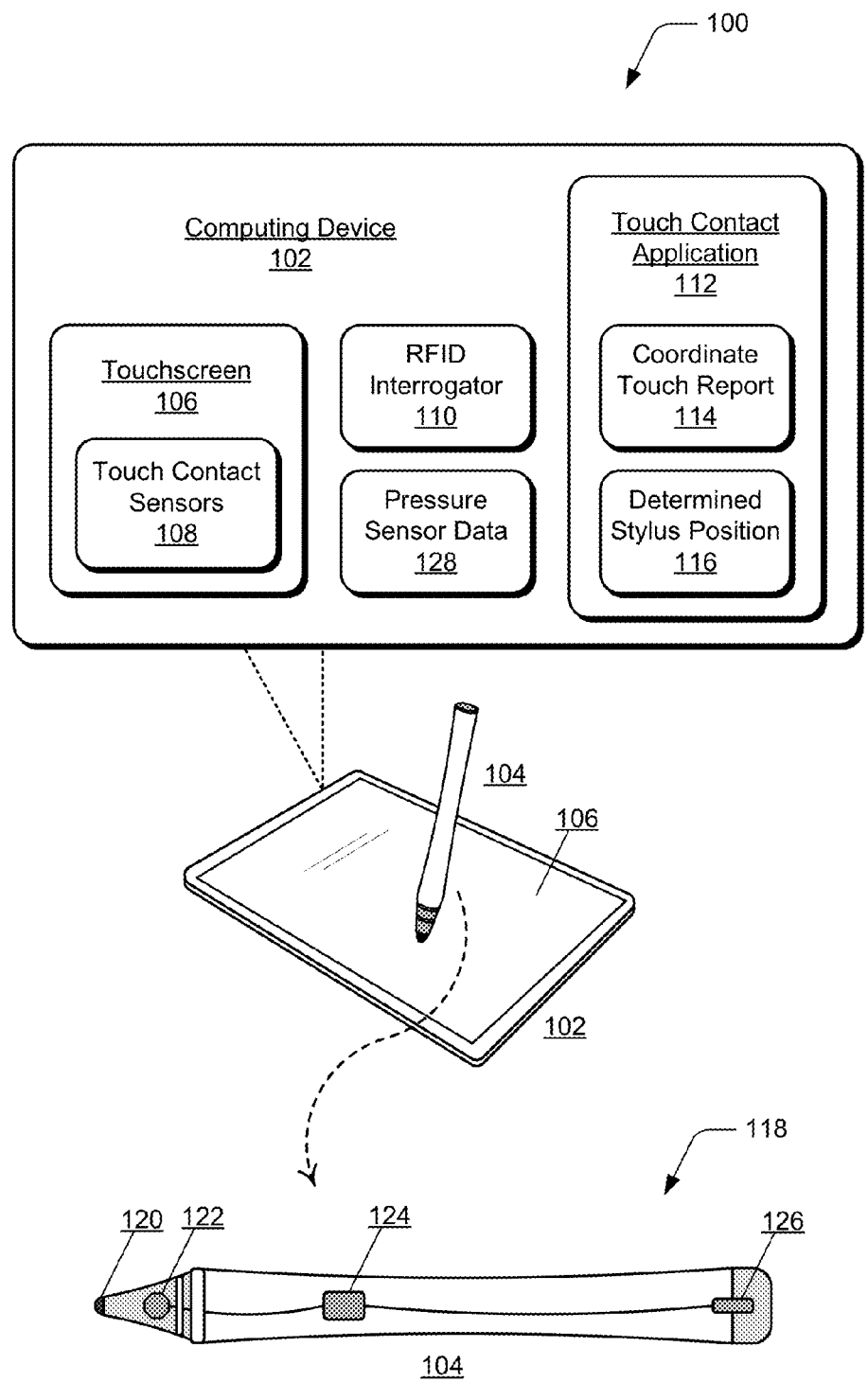
FIG. 1 illustrates an example system in which embodiments of a passive stylus with RFID-enabled sensing can be implemented.

Embodiments of a passive stylus with RFID-enabled sensing are described, such as for any type of computing device that may be implemented with a touchscreen designed for use with a stylus input device. Typically, a passive stylus interacts with a capacitive or resistive touchscreen system via touch contact or gesture inputs that are received on the surface of the touchscreen. Conventional touchscreen systems, however, often have difficulty distinguishing between a stylus that is actually contacting the touchscreen and a stylus that is hovering just above the touchscreen. This difficulty can reduce the functionality of the touchscreen and/or cause the touchscreen to misinterpret user input. Now, using the passive stylus with RFID-enabled sensing, a computing device can receive the x-y coordinate position of user inputs from the touchscreen system as well as data from a sensor that measures the pressure applied to the touchscreen at the tip of the stylus. The computing device can then combine the touchscreen data with the pressure data to distinguish between contact and hovering.

In embodiments, the passive stylus includes a conductive tip that is designed to interact with the touchscreen of the computing device via touch contact. The stylus also includes an integrated pressure sensor that senses applied pressure when the conductive tip contacts the touchscreen, such as when a user applies pressure to contact the touchscreen with the stylus. A passive RFID tag that also includes at least one RFID antenna is integrated into the stylus and in electronic communication with the pressure sensor. The passive RFID tag receives data from the pressure sensor when the stylus is used as an input device. Other sensors may optionally be integrated into the stylus, including one or more of a tilt sensor, a velocity sensor, or a motion direction sensor. The passive RFID tag can also receive data from these sensors to determine input characteristics such as the tilt angle of the stylus relative to the touchscreen, the velocity of the stylus tip, and the motion direction of the stylus tip.

The RFID antenna is positioned within the stylus in a way to prevent the antenna from becoming detuned when a user holds the stylus for use. For example, the antenna may be placed at one end of the stylus so that it is outside the normal gripping area of the stylus. In other embodiments, the stylus can include an additional RFID antenna that is positioned at the opposite end of the stylus from the first RFID antenna to prevent detuning when a user's grip covers one end of the stylus. Other methods for preventing detuning are also contemplated. For example, the RFID antenna may be wrapped around a core within the stylus so that there is a gap between the inner surface of the stylus body and the RFID antenna, affixed to a telescoping member that can extend the antenna outside the gripping surface, or attached to the exterior of the stylus such that a user can see the RFID antenna and avoid covering it when gripping the stylus.

In aspects of a passive stylus with RFID-enabled sensing, an RFID interrogator in the computing device interrogates the passive RFID tag in the passive stylus. In response, the RFID tag sends data describing the pressure that is applied to the conductive tip of the stylus. Both the x-y coordinate report described above and the pressure data can be time stamped. The computing device can therefore match the pressure data with corresponding x-y coordinate reports, in real time, to determine whether a reported touch contact in the coordinate report is an actual contact or merely the conductive tip hovering above the touchscreen. The signal from the RFID interrogator that interrogates the passive RFID tag also powers the pressure sensor and the passive RFID tag, and the stylus therefore does not require its own power source.

In further aspects, a computing device can detect the passive RFID tag in the stylus to determine the proximity of the stylus to the computing device. The computing device can then use the proximity as an indication to initiate or power the RFID interrogator and other components for use in the device, thereby conserving power for the computing device by powering the components used to interact with the stylus only when the stylus is detected in proximity to the screen. The computing device can detect the stylus via conventional methods such as using the touchscreen sensors to detect the conductive tip of the stylus. Additionally or alternatively, the computing device can detect the proximity of the stylus by other methods, such as using a piezoelectric sensor on the device to detect a touch contact or using an electronic compass in the device to detect a magnet that is optionally integrated into the stylus.

While features and concepts of a passive stylus with RFID-enabled sensing can be implemented in any number of different devices, systems, environments, and/or configurations, embodiments of passive stylus with RFID-enabled sensing are described in the context of the following example devices, systems, and methods.

FIG. 1 illustrates an example system 100 in which embodiments of a passive stylus with RFID-enabled sensing can be implemented. The example system 100 includes a computing device 102 and a passive stylus 104, and the computing device 102 may be any type of device that includes an integrated touchscreen 106 implemented for touch contact inputs, such as with the stylus 104 or finger contact. The computing device 102 may be any type of a mobile phone, tablet device, digital camera, multimedia device, or other types of computing and electronic devices. In this example, the computing device 102 implements components and features of the touchscreen 106, including touch contact sensors 108. The touchscreen 106 can be utilized by a user of the computing device 102, and the touch contact sensors 108 detect user touch contact inputs that allow the user to interact with the device, as well as with programs and applications installed on the device. The computing device 102 can also be implemented with additional, various components, such as a processing system and memory, and any number and combination of components as further described with reference to the example device shown in FIG. 4.

In this example system 100, the computing device 102 also includes an RFID interrogator 110 and a touch contact application 112 that is implemented to generate a coordinate touch report 114 and determine a stylus position 116 of the stylus 104 on the touchscreen 106. The coordinate touch report 114 is generated to indicate the x-y coordinate position of each user touch contact or gesture contact. The determined stylus position 116 can include the coordinate touch report 114, as well as data describing the tilt angle, velocity, and/or motion direction of the stylus 104.

The touch contact application 112 can be implemented as a software application or module, such as executable software instructions (e.g., computer-executable instructions) that are executable with a processing system of the computing device in embodiments of the passive stylus with RFID-enabled sensing. The touch contact application 112 can be stored on computer-readable storage memory (e.g., a memory device), such as any suitable memory device or electronic data storage implemented in the computing device.

An example 118 illustrates an implementation of the passive stylus 104 with RFID-enable sensing. The example stylus is generally referred to as a "passive" stylus because it does not use its own power to actively send a signal to the touchscreen to indicate its position, but is instead passively detected by the touchscreen. In this example, the stylus 104 includes a conductive tip 120 that is designed for touch contact to interact with the touchscreen 106 of the computing device 102. The stylus 104 also includes a pressure sensor 122 that senses applied pressure when the conductive tip 120 contacts a surface of the touchscreen, such as when a user applies pressure to contact the touchscreen with the stylus. In implementations, the pressure sensor 122 is a multi-axis pressure sensor, and the pressure sensor data is used by the computing device 102 to provide a PC keyboard track pointer experience when the conductive tip of the stylus is firmly contacting the surface of the touchscreen.

The stylus also includes a passive RFID tag 124 and at least one RFID antenna 126 of the RFID tag. The passive RFID tag 124 is implemented to receive pressure sensor data 128 from the pressure sensor 122 when the stylus 104 is used as an input device and the conductive tip 120 contacts the surface of the touchscreen of the computing device 102. In this example, the RFID antenna 126 of the RFID tag is positioned within the stylus 104, such as in the top end of the stylus, so that the antenna is not detuned when a user holds the stylus for use. Optionally, the stylus 104 can include an additional RFID antenna (not shown) that is positioned at the end of the stylus opposite of the first RFID antenna 126 to prevent interference with reading the passive RFID tag 124.

In embodiments, the RFID interrogator 110 that is implemented in the computing device 102 can interrogate the passive RFID tag 124 in the stylus 104, and the RFID tag responds to the RFID interrogator with an indication (e.g., pressure sensor data 128) of the pressure that is applied to the conductive tip 120 of the stylus. The pressure sensor data 128 can then be utilized by the touch contact application 112 to determine whether the conductive tip 120 of the stylus 104 is contacting the touchscreen. As described above, most capacitive or resistive touchscreens used with a passive stylus have difficulty determining whether the stylus is actually touching (e.g., making contact with) the touchscreen, or merely hovering close to it, which can limit the functionality of the touchscreen and/or cause the touchscreen to misinterpret user input.

By being able to communicate with the passive RFID tag 124 in the stylus 104, the RFID interrogator 110 in the computing device 102 can obtain the pressure sensor data 128 from the stylus, and the touch contact application 112 can determine whether a detected user input corresponds to pressure on the touchscreen that would indicate the stylus 104 contacting the touchscreen, or whether a detected user input is simply the stylus hovering over the touchscreen. With the benefit of the pressure sensor data 128 received from the stylus 104, the touch contact application 112 can also determine that the tip of the stylus is contacting the touchscreen even when only minimal pressure is applied by the user of the stylus and the device. Optionally, the touch contact application 112 can also utilize the coordinate touch report 114 and/or the determined stylus position 116 in combination with pressure sensor data 128 to determine whether the conductive tip 120 of the stylus 104 is contacting the touchscreen 106 of the computing device. In additional implementations, the passive RFID tag 124 in the stylus 104 is readable by the computing device 102 to determine a proximity of the stylus to the computing device, which may be used as an indication to initiate or power components for use in the device.

Figure 2:
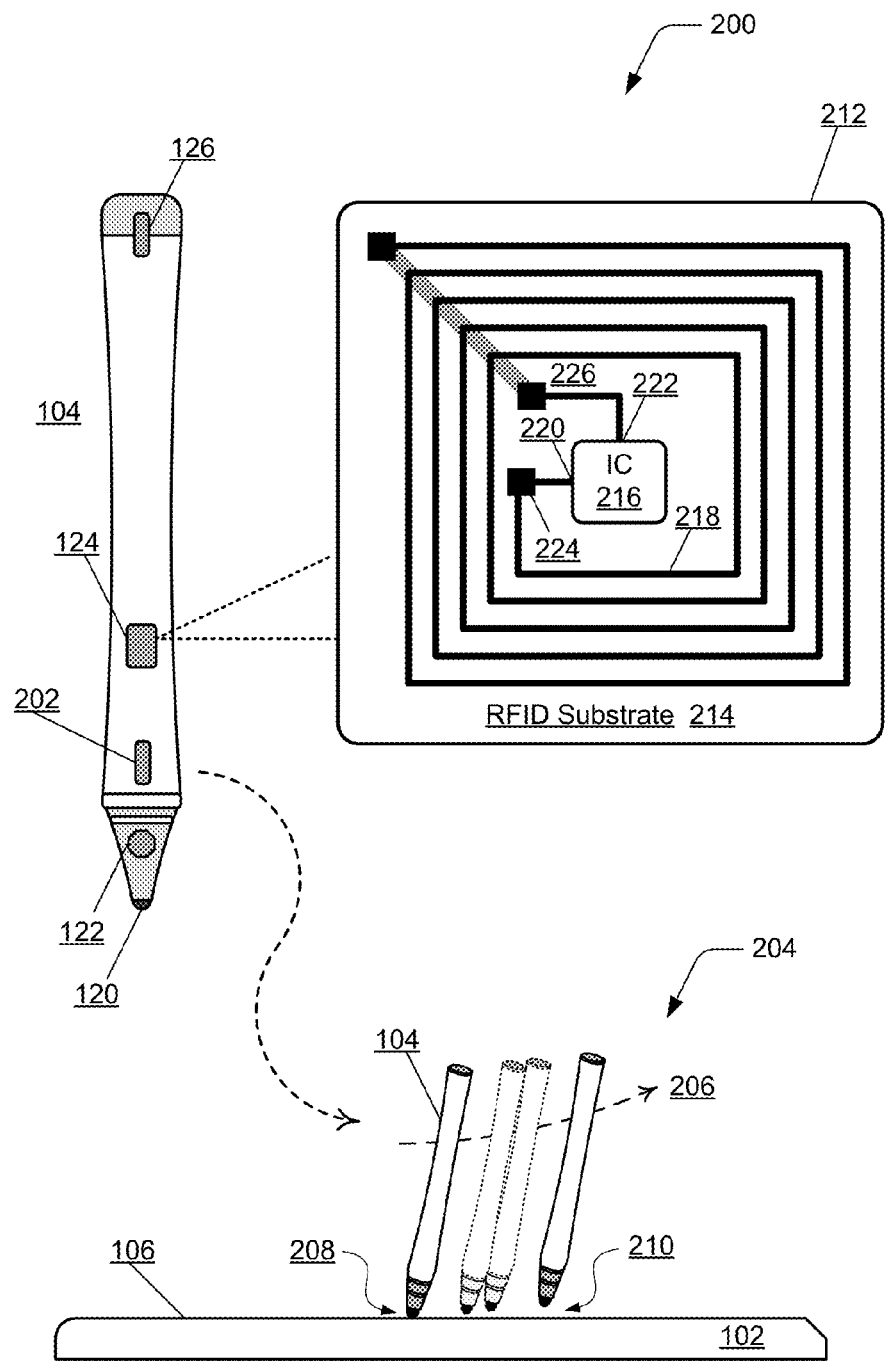
FIG. 2 further illustrates examples of a passive stylus with RFID-enabled sensing in accordance with one or more embodiments.

FIG. 2 further illustrates an example 200 of the passive stylus 104 with RFID-enabled sensing as shown and described with reference to FIG. 1. The stylus 104 includes the pressure sensor 122 that senses the applied pressure at the conductive tip 120, and includes the passive RFID tag 124 and RFID antenna 126. Additionally, the stylus 104 may include an additional RFID antenna 202, which is positioned at the end of the stylus opposite of RFID antenna 126 to prevent interference with reading the passive RFID tag 124. As shown at 204, a user who is using the stylus as an input device on the touchscreen 106 of the computing device 102 may make a touch contact and then lift off slightly to continue a gesture or change input location on the touchscreen. For example, as shown by arrow 206, the stylus may hover over touchscreen 106 between a touch contact 208 and the lift-off at 210. The intermediate images of the stylus 104 between the touch contact 208 and the lift-off 210 depict the stylus hovering over the touchscreen 106, which as described above, may limit the functionality of the touchscreen or cause the touchscreen to misinterpret the user input.

In implementations, the computing device 102 can detect the proximity of the RFID tag 124 in the stylus 104 and power the RFID interrogator when the RFID tag comes within a threshold proximity to the touchscreen. Additionally, the stylus 104 may include additional sensors that are implemented so that their data can be read by the RFID interrogator 110 of the computing device 102. For example, the stylus 104 may include a tilt sensor, an accelerometer, or a motion sensor (not shown). The touch contact application 112 can utilize the data, taken together with similar data from the touchscreen's main platform, to determine the input characteristics of the stylus, such as the tilt angle of the stylus with respect to the touchscreen surface, the velocity of the stylus, and/or the direction of motion of the stylus (e.g., the determined stylus position 116) and incorporate those characteristics in determining whether the stylus 104 is contacting the touchscreen 106 of the computing device 102. An advanced, multi-axis mechanical force sensor at the stylus tip 120, taken together with known static and dynamic friction characteristics between the stylus tip and the touchscreen surface, can enable direct measurements of the input characteristics of the stylus, such as the tilt angle of the stylus with respect to the touchscreen surface, the velocity of the stylus, and/or the direction of motion of the stylus (e.g., the determined stylus position 116) and incorporate those characteristics in determining whether the stylus 104 is contacting the touchscreen 106 of the computing device 102. The multi-axis force sensor can also enable the RFIT passive stylus to provide a track-pointer experience similar to that of a PC keyboard by registering lateral forces on a firmly planted stylus tip in contact with the surface of the touchscreen.

FIG. 2 also illustrates an example of an RFID tag 212 in which embodiments of an RFID logic tag can be implemented as the passive RFID tag 124 in the stylus 104. The example RFID tag 212 may be implemented as any of the RFID tags described herein, to include the RFID tag 124 shown and described with reference to FIG. 1. The example RFID tag 212 is shown as a schematic diagram, and includes an RFID substrate 214, which may be paper, plastic (e.g., flexible or rigid), wood, glass, ceramic, a printed circuit board (PCB), or some combination thereof. The RFID substrate 214 forms a foundation or framework of a supporting structure for the RFID tag.

The RFID substrate 214 includes or at least supports an integrated circuit (IC) 216 and an antenna 218 that enables the IC 216 to transmit and receive wireless radio signals. The IC 216 includes a first antenna terminal 220 and a second antenna terminal 222. The antenna 218 includes a first antenna end 224 and a second antenna end 226. The first antenna end 224 or the second antenna end 226 may be considered an antenna loop in, and the other end may be considered an antenna loop out. The first antenna terminal 220 of the IC 216 is coupled to the first antenna end 224 of the antenna 218, and the second antenna terminal 222 of the IC 216 is coupled to the second antenna end 226 of the antenna 218.

The IC 216 may be implemented using any of one or more processors (e.g., a microprocessor, a controller, a computing core, or a combination thereof) or processing systems with storage memory having processor-executable instructions that are fixed, hardware-encoded, programmable, alterable, wirelessly-receivable, or a combination thereof The IC 216 can be implemented as an application-specific integrated circuit (ASIC), a field-programmable gate array (FPGA), a complex programmable logic device (CPLD), an application-specific standard product (ASSP), a system on-a-chip (SoC), a silicon-based processing unit, or as some combination thereof Generally, an integrated circuit can be designed with hardware along with one or more of software, firmware, or fixed logic circuitry that is implemented in connection with processing or control circuits.

The RFID tag 212 may further include processor-accessible storage memory (not explicitly shown) that is integrated with or discrete from the IC 216. The storage memory enables persistent storage of data and processor-executable instructions (e.g., software applications, programs, functions, hard-coded operations, or a combination thereof). The storage memory can include various implementations of random access memory (RAM), read only memory (ROM), flash memory, or other types of storage media in various memory device configurations. Although not specifically indicated in FIG. 2, the RFID tag 212 may further include an interconnect (e.g., a bus or other data transfer mechanism with traces, wires, buffers, etc.) that couples components of the RFID tag 212 to each other. The RFID tag 212may also include a power source, such as a single-use battery, a battery that is rechargeable by wire or wirelessly, a capacitor, a combination thereof, and so forth.

The RFID tags may be produced in many different shapes, sizes, form factors, and materials. The RFID substrate 214 of the RFID tag 212 can be adhered to another object, such as the stylus 104. For example, the RFID substrate 214, or the IC 216 and the associated antenna 218, may be wrapped around a core within the body of the stylus 104 to create a gap between the antenna and the outside gripping surface of the stylus 104. In other implementations, the RFID substrate 214 or the IC 216 and the associated antenna 218 may be affixed to an extendable member so that the antenna may be extended outside of the gripping area of the stylus 104. Moreover, the RFID tag 212 may be attached to the exterior surface of the stylus 104 or mounted to the interior in an exposed or visible manner (e.g., through a window in the stylus 104). In any implementation, the RFID tag 212 may be enclosed within or encapsulated by another material or object.

Example method 300 is described with reference to FIG. 3 in accordance with implementations of a passive stylus with RFID-enabled sensing. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 3:
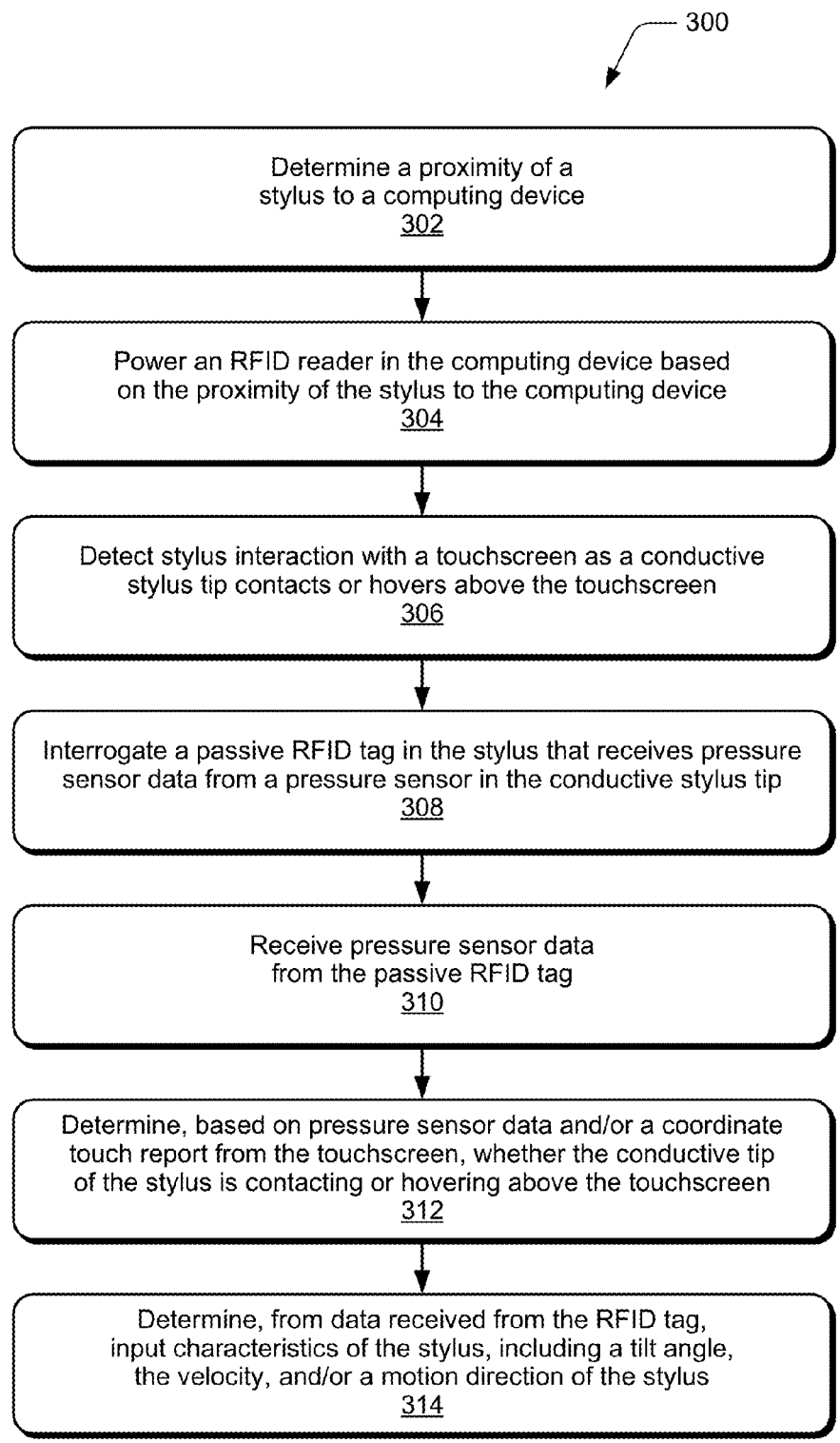
FIG. 3 illustrates example method(s) of using a passive stylus with RFID-enabled sensing in accordance with one or more embodiments.

FIG. 3 illustrates example method(s) 300 of a passive stylus with RFID-enabled sensing. The order in which the method is described is not intended to be construed as a limitation, and any number or combination of the described method operations can be performed in any order to perform a method, or an alternate method.

At 302, a proximity of a stylus to a computing device is determined and, at 304, an RFID interrogator in the computing device is powered based on the proximity of the stylus to the computing device. For example, the computing device 102 detects the proximity of the stylus 104 to the computing device, such as based on the touch contact sensors 108 of the touchscreen 106 sensing the proximity of the stylus 104, and components of the computing device 102, such as the RFID interrogator 110, can then be initiated or powered based on the determined proximity of the stylus 104 to the computing device.

In other implementations (not shown), the components of the computing device 102 can be initiated or powered based on other inputs. For example, a touchscreen system that includes a piezoelectric sensor may determine the proximity of the stylus by detecting when the tip of the stylus contacts the touchscreen. In another implementation, the stylus may include a magnet and the computing device may include an electronic compass. The RFID interrogator 110 of the computing device 102 may then be powered when the electronic compass detects the proximity of the magnet.

At 306, an interaction between the stylus and the touchscreen is detected as the conductive tip of the stylus contacts or hovers above the touchscreen. For example, the touch screen sensors 108 of the touchscreen 106 recognize that the conductive tip 120 of the stylus 104 has contacted the touchscreen 106, or is hovering close to the touchscreen, and record an interaction, such as the coordinate touch report 114.

At 308, a passive RFID tag is interrogated and, at 310, pressure sensor data is received from a passive RFID tag. For example, the passive RFID tag 124 implemented in the stylus 104 receives pressure sensor data 128 from the pressure sensor 122 that is integrated in the stylus 104. The passive RFID tag 124 can then be interrogated, such as by the RFID interrogator 110 of computing device 102. The RFID interrogator 110 then receives the pressure sensor data 128 from the passive RFID tag 124 in the stylus 104.

At 312, a determination is made as to whether the conductive tip of a stylus is contacting a touchscreen, based on either pressure sensor data or a combination of pressure sensor data and a coordinate touch report from the touchscreen. For example, the touch contact application 112 utilizes the coordinate touch report 114 and/or the determined stylus position 116 in combination with the pressure sensor data 128 to determine whether the conductive tip 120 of the stylus 104 is contacting the touchscreen 106 of the computing device.

At 314, one or more input characteristics of the stylus are determined. For example, the touch contact application 112 generates the coordinate touch report 114 and determines a stylus position 116 of the stylus 104 on the touchscreen 106. The coordinate touch report 114 indicates the x-y coordinate position of each user touch contact or gesture contact. The determined stylus position 116 can include the coordinate touch report 114, as well as data describing the tilt angle, velocity, and/or motion direction of the stylus 104.

Figure 4:
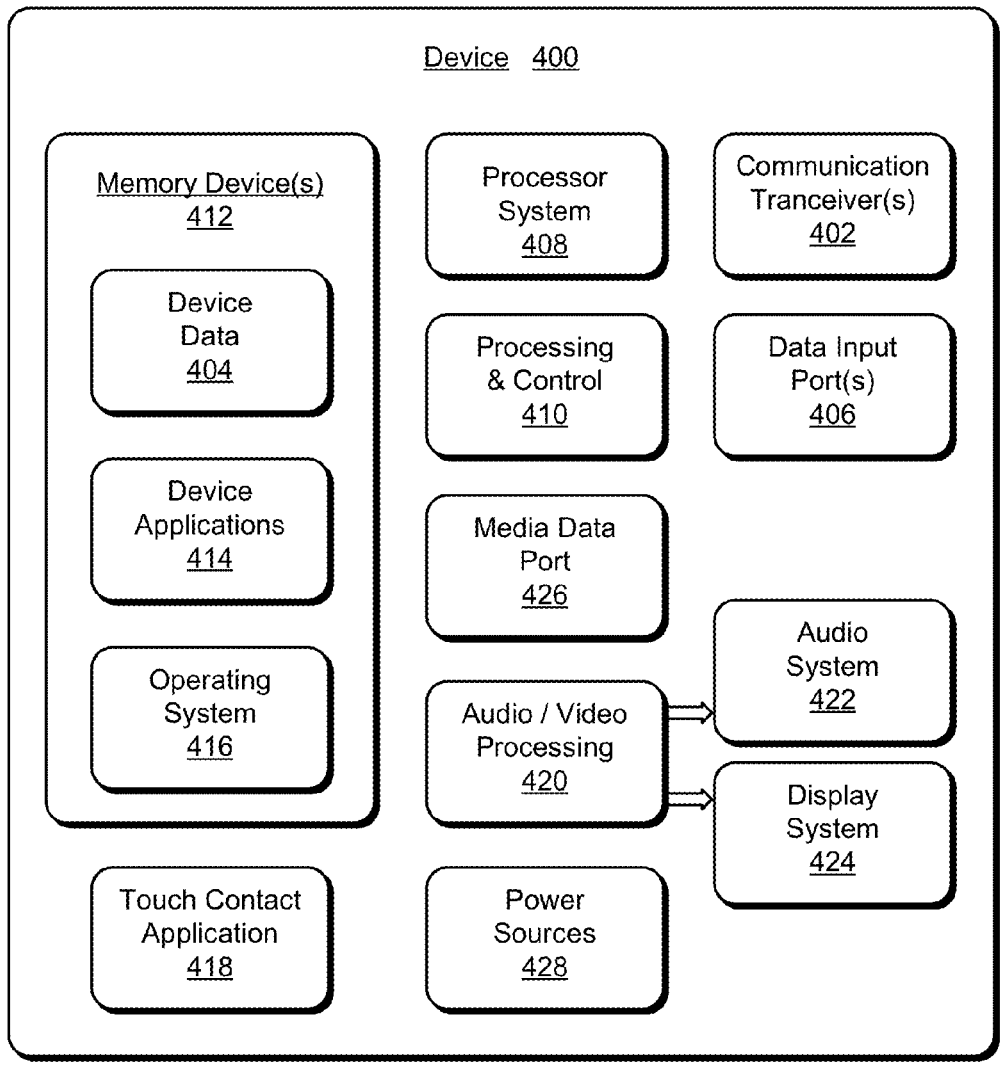
FIG. 4 illustrates various components of an example device that can implement embodiments of a passive stylus with RFID-enabled sensing.

FIG. 4 illustrates various components of an example device 400 in which embodiments of a passive stylus with RFID-enabled sensing can be implemented. The example device 400 can be implemented as any of the computing devices described with reference to the previous FIGS. 1-3, such as any type of client device, mobile phone, tablet, computing, communication, entertainment, gaming, media playback, and/or other type of device. For example, the computing device 102 shown in FIG. 1 may be implemented as the example device 400.

The device 400 includes communication transceivers 402 that enable wired and/or wireless communication of device data 404 with other devices. Additionally, the device data can include any type of audio, video, and/or image data. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, and wired local area network (LAN) Ethernet transceivers for network data communication.

The device 400 may also include one or more data input ports 406 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 400 includes a processing system 408 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 410. The device 400 may further include any type of a system bus or other data and command transfer system that couples the various components within the device. A system bus can include any one or combination of different bus structures and architectures, as well as control and data lines.

The device 400 also includes computer-readable storage memory 412 that enable data storage, such as data storage devices that can be accessed by a computing device, and that provide persistent storage of data and executable instructions (e.g., software applications, programs, functions, and the like). Examples of the computer-readable storage memory 412 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 400 may also include a mass storage media device.

The computer-readable storage memory 412 provides data storage mechanisms to store the device data 404, other types of information and/or data, and various device applications 414 (e.g., software applications). For example, an operating system 416 can be maintained as software instructions with a memory device and executed by the processing system 408. The device applications may also include a device manager, such as any form of a control application, software application, signal-processing and control module, code that is native to a particular device, a hardware abstraction layer for a particular device, and so on. In this example, the device 400 includes a touch contact application 418 that implements embodiments of a passive stylus with RFID-enabled sensing, and may be implemented with hardware components and/or in software, such as when the device 400 is implemented as the computing device 102 described with reference to FIGS. 1-3. An example of the touch contact application 418 is the touch contact application 112 that is implemented by the computing device 102.

The device 400 also includes an audio and/or video processing system 420 that generates audio data for an audio system 422 and/or generates display data for a display system 424. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 426. In implementations, the audio system and/or the display system are integrated components of the example device. Alternatively, the audio system and/or the display system are external, peripheral components to the example device.

The device 400 can also include one or more power sources 428, such as when the device is implemented as a mobile device. The power sources may include a charging and/or power system, and can be implemented as a flexible strip battery, a rechargeable battery, a charged super-capacitor, and/or any other type of active or passive power source.

Although embodiments of a passive stylus with RFID-enabled sensing have been described in language specific to features and/or methods, the subject of the appended claims is not necessarily limited to the specific features or methods described. Rather, the specific features and methods are disclosed as example implementations of a passive stylus with RFID-enabled sensing, and other equivalent features and methods are intended to be within the scope of the appended claims. Further, various different embodiments are described and it is to be appreciated that each described embodiment can be implemented independently or in connection with one or more other described embodiments.

The invention claimed is:

1. A stylus, comprising:
a conductive tip configured to interact with a touchscreen of a computing device;
a pressure sensor configured to sense pressure when the conductive tip contacts the touchscreen;
a passive RFID tag configured to receive pressure sensor data from the pressure sensor, the passive RFID tag readable by the computing device to determine whether the conductive tip of the stylus is contacting the touchscreen, or whether the stylus is hovering above the touchscreen;
an RFID antenna of the passive RFID tag, the RFID antenna positioned in a body of the stylus to prevent detuning the RFID antenna when the stylus is held for use; and
an additional RFID antenna of the passive RFID tag, the additional RFID antenna positioned at an opposite end of the body of the stylus to prevent interference with reading the passive RFID tag.

2. The stylus as recited in claim 1, wherein the passive RFID tag is further readable by the computing device to determine that the conductive tip of the stylus is contacting the touchscreen.

3. The stylus as recited in claim 1, wherein the pressure sensor data is readable from the passive RFID tag, and wherein the pressure sensor data is utilized with a coordinate touch report to determine that the conductive tip of the stylus is contacting the touchscreen.

4. The stylus as recited in claim 3, wherein the pressure sensor is a multi-axis pressure sensor, and the pressure sensor data from the multi-axis pressure sensor located in the conductive tip of the stylus is used by the computing device to provide a PC keyboard track pointer experience when the conductive tip of the stylus is firmly contacting a surface of the touchscreen.

5. The stylus as recited in claim 1, wherein the passive RFID tag is further readable by the computing device to determine a proximity of the stylus to the computing device, and wherein the computing device is configured to power an RFID interrogator based on a determination of the proximity of the stylus.

6. The stylus as recited in claim 1, wherein the passive RFID tag is further readable by the computing device to determine one or more input characteristics of the stylus when the conductive tip of the stylus is contacting the touchscreen, the one or more input characteristics including a tilt angle of the stylus, a velocity of the stylus, and a motion direction of the stylus.

7. A method for determining stylus interaction with a touchscreen of a computing device, the method comprising:
detecting the stylus interaction with the touchscreen as a conductive tip of the stylus contacts the touchscreen or hovers above the touchscreen;
interrogating a passive RFID tag that is integrated in the stylus, the RFID tag having an RFID antenna positioned in a body of the stylus to prevent detuning the RFID antenna when the stylus is held for use and an additional RFID antenna positioned at an opposite end of the body of the stylus to prevent interference with reading the passive RFID tag, the passive RFID tag configured to receive pressure sensor data from a pressure sensor that senses pressure when the conductive tip of the stylus contacts the touchscreen;
receiving the pressure sensor data from the passive RFID tag; and
determining, based on the pressure sensor data, whether the conductive tip of the stylus is contacting the touchscreen, or whether the stylus is hovering above the touchscreen.

8. The method as recited in claim 7, wherein said determining whether the conductive tip of the stylus is contacting the touchscreen is based on the pressure sensor data that indicates pressure at the conductive tip.

9. The method as recited in claim 7, further comprising:
determining a proximity of the stylus to the computing device; and
powering an RFID interrogator in the computing device based on said determining the proximity of the stylus.

10. The method as recited in claim 7, wherein the pressure sensor is integrated in the stylus to sense the pressure when the conductive tip of the stylus contacts the touchscreen.

11. The method as recited in claim 7, further comprising:
utilizing the pressure sensor data and a coordinate touch report for said determining that the conductive tip of the stylus is contacting the touchscreen.

12. The method as recited in claim 7, further comprising:
determining, from the passive RFID tag, one or more input characteristics of the stylus when the conductive tip of the stylus is contacting the touchscreen, the one or more input characteristics including a tilt angle of the stylus, a velocity of the stylus, and a motion direction of the stylus.

13. A system, comprising:
a computing device that includes a touchscreen configured for touch contact and an RFID interrogator configured to interrogate a passive RFID tag;
a stylus that includes:
  a conductive tip configured for interaction with the touchscreen;
  a pressure sensor configured to sense pressure when the conductive tip contacts the touchscreen;
  the passive RFID tag configured to receive pressure sensor data from the pressure sensor, the passive RFID tag readable by the RFID interrogator of the computing device to determine the pressure applied to the conductive tip of the stylus;
  an RFID antenna of the passive RFID tag, the RFID antenna positioned in a body of the stylus to prevent detuning the RFID antenna when the stylus is held for use; and
  an additional RFID antenna of the passive RFID tag, the additional RFID antenna positioned at an opposite end of the body of the stylus to prevent interference with reading the passive RFID tag.

14. The system as recited in claim 13, wherein the passive RFID tag is further readable by the RFID interrogator to determine that the conductive tip is contacting the touchscreen.

15. The system as recited in claim 13, wherein the pressure sensor data is readable from the passive RFID tag, and wherein the pressure sensor data is utilized with a coordinate touch report to determine that the conductive tip of the stylus is contacting the touchscreen.

16. The system as recited in claim 13, wherein the passive RFID tag is further readable by the RFID interrogator of the computing device to determine a proximity of the stylus to the computing device, and wherein the computing device is configured to power the RFID interrogator based on a determination of the proximity of the stylus.

17. The system as recited in claim 13, wherein the passive RFID tag is further readable by the RFID interrogator of the computing device to determine one or more input characteristics of the stylus when the conductive tip of the stylus is contacting the touchscreen, the one or more input characteristics including a tilt angle of the stylus, a velocity of the stylus, and a motion direction of the stylus.

18. The stylus as recited in claim 1, further comprising a tilt sensor configured to sense the tilt angle of the stylus when the conductive tip of the stylus contacts the touchscreen.

19. The stylus as recited in claim 1, further comprising a velocity sensor configured to sense the velocity of the stylus when the conductive tip of the stylus contacts the touchscreen.

20. The stylus as recited in claim 1, further comprising a motion direction sensor configured to sense the motion direction of the stylus when the conductive tip of the stylus contacts the touchscreen.

* * * * *